INVENTOR:
Malcolm M. McQueen

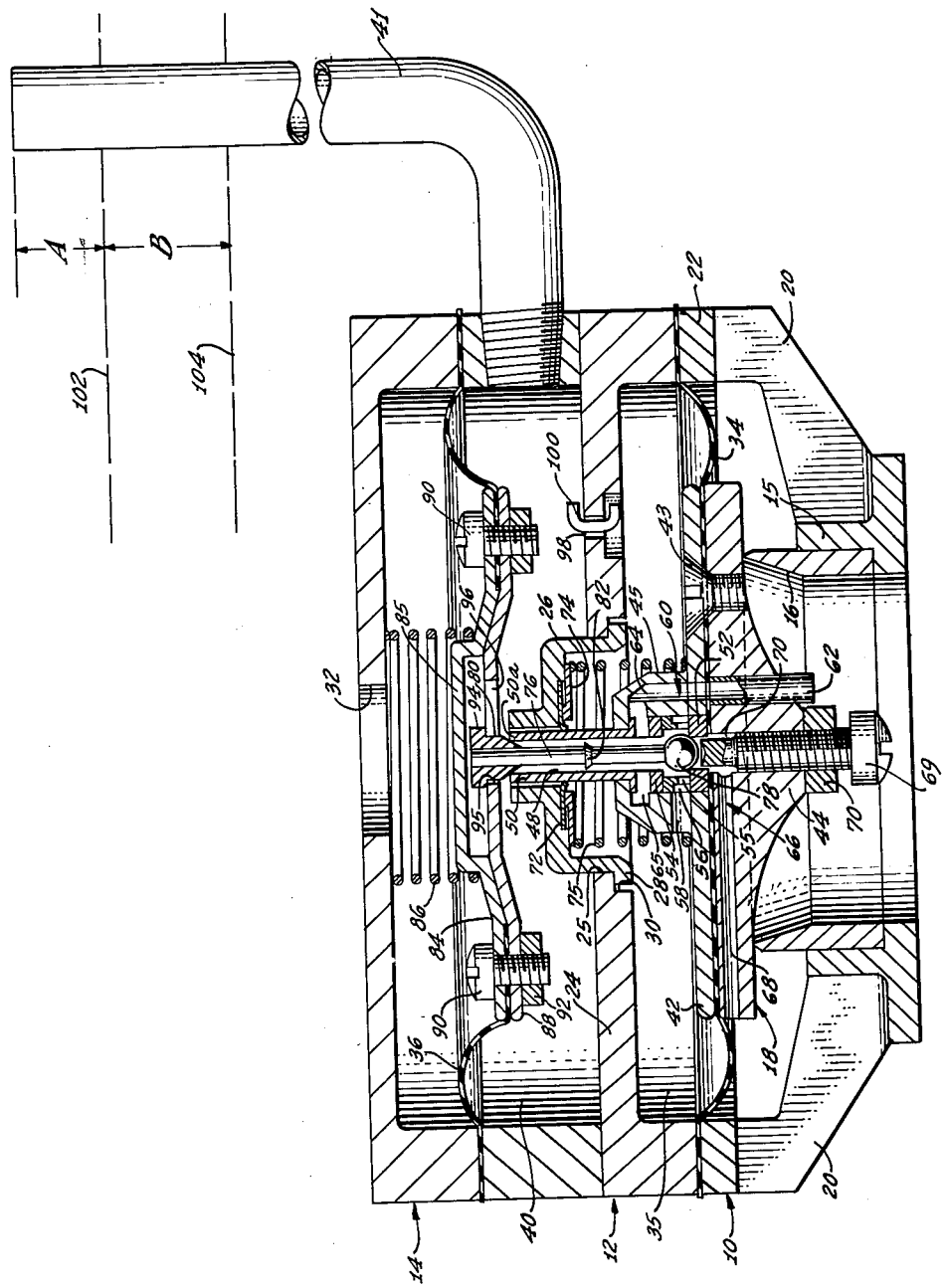

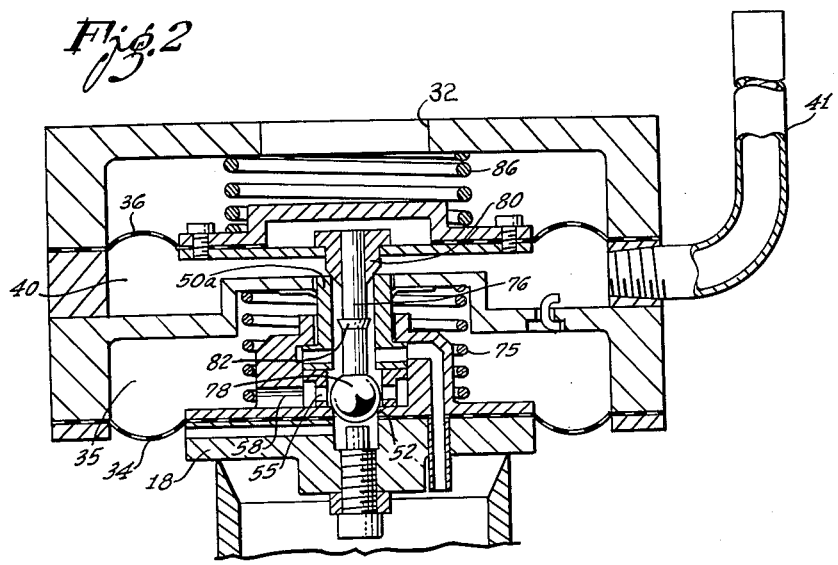
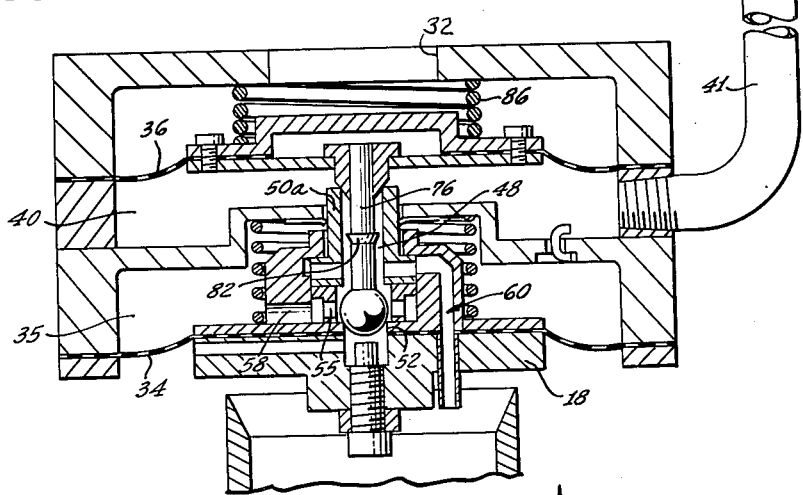
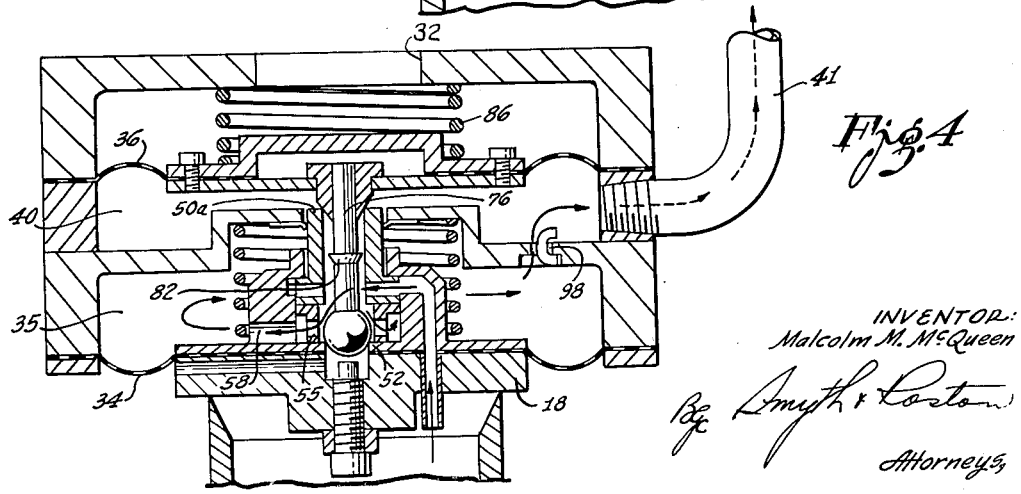

By Smyth & Roston
Attorneys

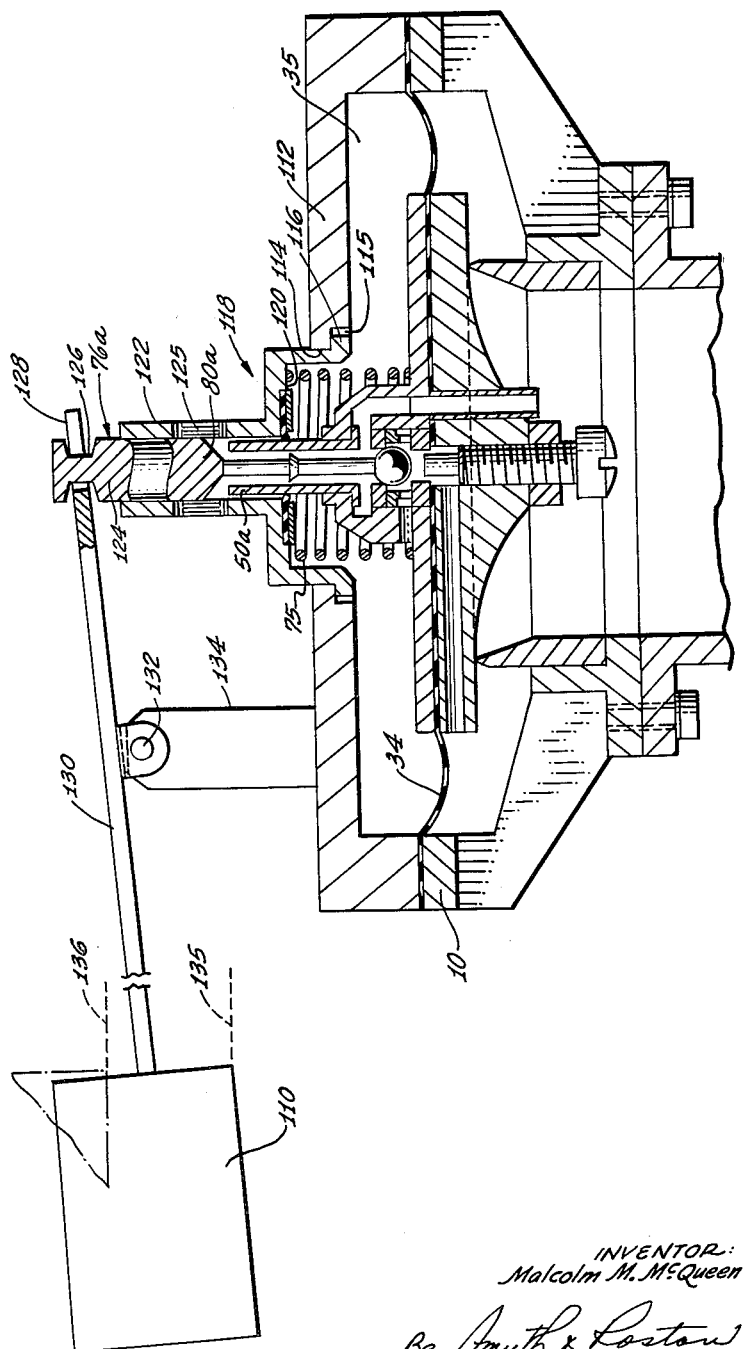

United States Patent Office

3,058,485
Patented Oct. 16, 1962

3,058,485
WEIGHT OF LIQUID RESPONSIVE VALVE
Malcolm M. McQueen, North Hollywood, Calif., assignor to Telecomputing Corporation, Los Angeles, Calif., a corporation of California
Filed July 24, 1959, Ser. No. 829,286
6 Claims. (Cl. 137—403)

This invention relates to a valve control and more particularly relates to a valve arrangement for controlling a fluid under pressure, in which arrangement the valve is caused to follow the movement of a control means by feedback control. With feedback control, the valve functions as a slave or automatic follower and conforms closely to the movements of the control means without the employment of any direct mechanical connection between the control means and the valve and without the necessity for the control means to transmit valve-actuating force.

While such a valve arrangement is widely applicable to control of pressurized fluids, both gaseous and liquid, it has been initially embodied in a liquid-level responsive valve for controlling the flow of liquid fuel into an aircraft fuel tank either during flight or when the aircraft is on the ground. This particular practice of the invention has been selected for the present disclosure and will provide adequate guidance for those skilled in the art who may have occasion to apply the same principles to other specific purposes.

An aircraft that is adapted for refueling during flight has a fuel duct or manifold that leads from a probe on the nose of the aircraft to a number of separate fuel tanks. The manifold may be used not only for refueling operations but also in normal flight to convey fuel from the different fuel tanks to the engines of the aircraft or from tank to tank.

A normally closed valve means for each fuel tank is adapted to open for a refueling operation in response to the supply pressure in the manifold and to close automatically when the tank is full. Failure of the automatic valve means to close when the tank is full is a serious matter since the fuel is supplied an aircraft in flight at rates as high as six hundred gallons per minute and at pressures on the order of 50 p.s.i. or higher. Malfunctioning of the valve means may result in bursting of a fuel tank, or the dumping of fuel overboard, or in the creation of dangerously high pressure surges in the fuel line.

Usually such a valve means comprises a main fuel valve and at least one float-controlled pilot valve. Such a prior art valve means has serious disadvantages. One disadvantage, of course, is the number of moving parts that must be used. Another disadvantage is the ever present possibility that a float may fail. Because of this possibility and others, two float-actuated pilot valves are employed in some instances so that one pilot valve will shut off the main valve in the event that the other pilot valve fails to function. Still another disadvantage is that care must be taken to adjust the float mechanism properly and, even with great care, the liquid level varies at which the main valve shuts off flow.

A further disadvantage of prior art float-controlled valves resides in a dilemma or conflict of considerations as to whether the main inlet valve should be near the bottom of the tank or near the top. If the main inlet valve is near the bottom of the tank, it must be connected to an upper pilot valve by an extensive pilot valve passage and such an additional passage creates a substantial pressure drop which must be overcome by the pressure from the fuel supply. The pressure drop correspondingly reduces the responsiveness of the main valve to the supply pressure and may do so to the point that the main valve does not open at all. Consequently, in a refueling operation where several level control valves are connected to a common manifold system, the opening of some of the valves may cause the pressure in the manifold system to drop below the pressure required for opening of the remaining valves in the system. Some of the fuel tanks of the aircraft fill up while others remain closed.

If the refueling operation is carried out on the ground, this situation necessitates an unduly prolonged refueling time so that all of the valves may open eventually for filling all of the fuel tanks. If this situation occurs in flight, however, the initial filling of only some of the fuel tanks may result in such unbalanced weight distribution as to cause the aircraft to go out of control and crash.

On the other hand, placing the main valve on a stand pipe at an upper level in the tank to avoid the pressure drop involved in the use of a long pilot valve passage results in the high pressure fuel being released at high velocity at the upper level with consequent violent turbulence in the fuel body. This turbulence affects the pilot valve float and, in addition, tends to release hazardous static electricity discharges into the space above the fuel.

Because the first mentioned disadvantages of placing the main fuel valve at the bottom of the tank are more serious than the disadvantages incurred in placing the main valve at an upper level, the pilot valve is commonly made integral with the main shut-off valve and the integral valve unit is located at the top of the tank. These integral valve units are relatively heavy so that the whole valve installation is of excessive weight.

Another disadvantage of an integral valve unit is that it is inherently incapable of accurate control of the ultimate fuel level in a tank. For example, in a tank in which the surface of the fuel has an area of 19.5 square feet and the fuel is supplied at rates up to 600 gallons per minute under deadhead pressures ranging from 10 to 50 p.s.i. the usual integral valve unit will approximate a desired ultimate fuel level only with a wide range of tolerance of approximately plus or minus three-quarters of an inch.

Another disadvantage of the usual integral valve unit is that the pilot valve of the unit is controlled by a float. A float is vulnerable to vibration and negative "G" to such an extent that float controlled integral valves of the prevailing type frequently fail when subjected to these conditions.

The present invention avoids all of these difficulties by an arrangement in which a control means that is responsive to the liquid level in the fuel tank is movable through a range of positions corresponding to the range of positions of the main or shut-off valve. The pressurized liquid applies a valve opening force directly to the shut-off valve and means including a power chamber with a movable wall derives energy from the pressurized source to apply opposite closing force to the shut-off valve. Means is further provided to sense the adjustment of the shut-off valve relative to the position of the control means and to balance the opposed forces acting on the shut-off valve accordingly to cause the shut-off valve to follow closely the movements of the control means.

Within the scope of the invention, the control means may be simply a float which rises with the liquid level in the tank. In the preferred practice of the invention, however, the use of a float is avoided by employing a control means in the form of a control diaphragm which is exposed on one of its sides to the static head in the tank and is exposed on its other side to a reference pressure comparable to the desired static head. A feature of the invention is the concept of creating this reference pressure by a column of the liquid, the liquid for the column being diverted from the pressurized source. The control diaphragm is responsive to the differential between the instantaneous static head and the reference head and moves to a given limit position when the static head reaches a desired magnitude relative to the magnitude of the reference head. The shut-off valve follows the movement of the control diaphragm closely and shuts off flow when the control diaphragm moves to the given limit position.

The main or shut-off valve member that is under control of the diaphragm is urged toward its open position by the pressurized fluid, as heretofore stated, and the previously mentioned movable wall of the power chamber is directly connected to the main valve member to exert the required valve-closing force. The sensing means that detects the position of the main valve member relative to the control diaphragm and, accordingly, automatically balances the two opposed forces, comprises a pilot valve. The position-sensing pilot valve is incorporated in the shut-off valve member but is directly connected to the control diaphragm to be operated thereby to vary the pressure in the power chamber as required to cause the main valve member to follow the movements of the control diaphragm.

In the present embodiment of the invention, the main valve member incorporates a pilot valve chamber, the axis of which extends in the direction of movement of the main valve member. The control diaphragm flexes in the same direction. The pilot valve chamber in the main valve member has an inlet communicating with the inlet side of the main valve member to receive fluid from the pressurized source and the pilot valve chamber also communicates with the previously mentioned power chamber to transmit the pressurized fluid thereto. In addition, the pilot valve chamber has a port to release fluid received from the pressurized source and thus reduce the fluid pressure that is transmitted to the power chamber.

Slidingly mounted in the pilot valve chamber is a pilot valve member that is directly connected with the control diaphragm to sense the position of the main valve member relative to the control diaphragm. Movement of the main valve member relative to the position-sensing pilot valve member in the opening direction of the main valve member progressively restricts the release port of the pilot valve chamber and thus progressively increases the pressure in the previously mentioned power chamber to progressively increase the valve closing force. On the other hand, relative movement of the main valve member in its closing direction progressively opens the release port to lower the valve closing force.

It is apparent that this arrangement provides a feedback control which causes the main valve member to continuously seek a position at which the opposed valve operating forces are balanced and thus causes the main valve member to follow closely the diaphragm-controlled movements of the pilot valve member. In the preferred practice of the invention, spring means also exerts closing force on the shut-off valve, but the feedback arrangement automatically compensates for the spring force by correspondingly reducing the pressure in the power chamber.

The provision of a control diaphragm which is exposed both to the static head and to a refernce head permits the shut-off valve to be placed at the bottom of the fuel tank and also eliminates the need for a pilot tube with all of the difficulties, including excessive pressure drop, that are involved in fuel flow through a long pilot tube. With the main valve positioned at the bottom of the tank to sense the static head by means of the control diaphragm, the main valve member is also subjected to the changing static head.

A feature of the invention is the cancelling out of the effect of the static head on the main valve member. As will be made apparent, this end is accomplished by incorporating the main valve member in the movable wall of the previously mentioned power chamber and by making the area of this movable wall equal to the area of the control diaphragm. Preferably, the movable wall of the power chamber is a second diaphragm which may be termed a power diaphragm and the main valve member is connected to a central portion of this power diaphragm.

A further important feature of the invention is the concept of adding spring means to act on the control diaphragm in the same direction as the static head. The spring force is equivalent to only a small fraction of the desired ultimate static head and being exerted in the valve closing direction causes the main valve member to close in a desirably gradual manner when the rising static head approaches the desired final static head. Thus the diaphragrm spring means is compressed to the maximum during the major portion of the refueling operation when the static head and spring force are outbalanced by the reference head. Other means may also be employed to bias the control means towards the closed position as well as a spring. These forces could be caused by pressure, weights, electrical, etc.

In the final stage of the refueling operation when the combined force of the static head and the compressed spring means approach balance with the reference head, the spring means becomes effective to move the control diaphragm in a gradual manner to cause the main valve member to close in the desired gradual manner. For example, by suitable selection of spring rate the main valve member may start to close gradually when the fuel level rises to within two inches of the desired ultimate fuel level. The flow rate is very low as the last few gallons of fuel enter the tank with the result that the fuel body is relatively placid during the final moments to avoid interfering with accurate sensing of the rising fuel level. It may be further appreciated that with the flow rate extremely low at the moment of actual closing of the main valve, surge pressures generated by the closing of the valve is minimized. The beneficial effect is striking because the magnitude of the surge pressure varies as the square of the rate of flow. In conventional liquid level control valves, operating under the same conditions but closing abruptly, the surge pressure may reach destructive magnitudes.

A further important feature of the preferred practice of the invention is that the valve assembly may be a compact structure having only two moving parts contained within the same assembly. One moving part is the main or shut-off valve member together with the power diaphragm united therewith to form the power chamber. The second movable part is the control diaphragm together with the pilot valve member that is united therewith. This is in contrast with the prior art which requires two assemblies remotely located and connected by a pilot line.

With all of these features, the invention provides closer control of the ultimate fuel level in a tank than prior art devices. As heretofore stated, the actual liquid level provided by prevalent types of valve assemblies commonly varies from the desired level by as much as three-quarters of an inch. Now the liquid level may be held to a tolerance of only one-sixteeenth of an inch.

The various features and advantages of the invention may be understood from the following detailed description taken with the accompanying drawings.

In the drawings, which are to be regarded as merely illustrative:

FIG. 1 is a sectional view of the presently preferred embodiment of the invention that employs a reference column of the liquid for the purpose of liquid level control;

FIGS. 2 to 6 are simplified diagrammatic sectional views illustrating different stages in the cycle of operation of the embodiment shown in FIG. 1; and FIG. 7 is an axial view of a second embodiment of the invention in which the liquid-level responsive control means is a float.

Figure 5:
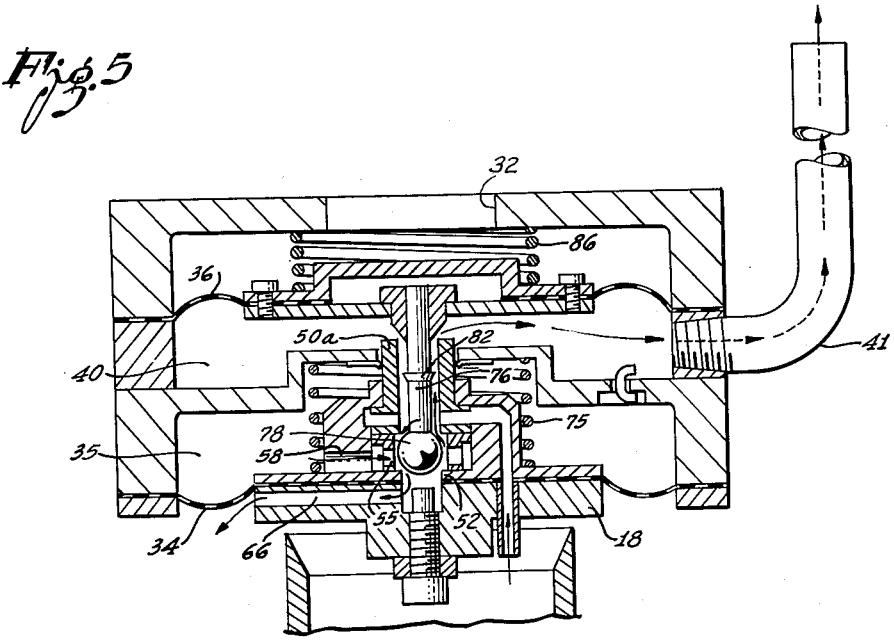

The Structure of the First Embodiment of the Invention

The first embodiment of the invention has a valve body made in three separate sections, namely, a lower cage section 10, an intermediate section 12 and an upper section 14. The lower cage section 10 is designed to be joined to the end of a supply pipe (not shown) that terminates at the bottom wall of the fuel tank. The lower cage section 10 provides a circular inlet structure 15 and a cylindrical valve seat 16 for a main shut-off valve member 18. The lower cage section 10 has upwardly extending legs 20 which are integral with an upper ring 22.

The intermediate section 12 of the valve body forms a transverse dividing wall 24 with an axial opening 25 in which is mounted an inverted cup-shaped guide member 26. The guide member 26 has a circumferential flange 28 around its lower edge which seats in a complementary annular recess 30 around the opening 25. The upper body section 14 is a cap having an opening 32 for fluid communication with the fuel in the tank. Suitable screws (not shown) releasably connect the three body sections 10, 12 and 14 together.

A lower diaphragm 34 which is the previously mentioned power diaphragm is interposed between the lower cage section 10 and the intermediate body section 12 and cooperates with the intermediate body section to form the previously mentioned power chamber 35. The upper side of the power chamber is the previously mentioned dividing wall 24.

An upper diaphragm 36 is interposed between the intermediate body section 12 and the upper body section 14 and cooperates with the intermediate body section to form a chamber 40. This upper diaphragm 36 is the previously mentioned control diaphragm and the chamber 40 may be termed a control chamber. The control chamber 40 connects with the lower end of a stand pipe 41 which extends to the upper region of the tank to confine a reference column of liquid.

The main or shut-off valve member 18 is carried by the power diaphragm 34 and for this purpose the diaphragm is sandwiched between the main valve member and a complementary disk 42. The main valve member and the disk are releasably interconnected by suitable screws 43. The main valve member 18 is in the form of a relatively thick disk with a downwardly extending central boss 44 on its underside. The complementary upper disk 42 has an upwardly extending boss 45 on its upper side. Thus the complementary disk 42 may be regarded as a separable part of the main valve member 18.

The main valve member 18 forms a pilot valve chamber 48 which is aligned with the direction of the opening and closing movements of the main valve member, the pilot valve chamber being coaxial with the main valve member. This pilot valve chamber 48 is formed in part by the upper boss 45, in part by a tubular extension 50 that extends upwardly from the boss and, in part, by three ring members inside the boss. These three ring members provide a lower valve seat 52 and an intermediate valve seat 54.

The pilot valve chamber 48 is in communication with the power chamber 35 and for this purpose has radial ports 55 which communicate with an annular space 56 and thereby communicate with a radial bore 58 that leads into the power chamber. What may be termed a first passage 60 is provided through the main valve member 18 to provide an inlet for fluid under pressure from the fluid source. In the construction, this first passage 60 includes a tube 62 below the power diaphragm, a bore 64 extending above the power diaphragm and an annular space 65 adjacent the lower end of the tubular extension 50.

What may be termed a second passage 66 is provided in the main valve member 18 to release fluid from the pilot valve chamber 48 and thereby control the pressure in the power chamber. This second passage 66 is formed by the lower valve seat 52 together with an axial bore 67 and a radial bore 68, the radial bore discharging into the fuel tank to one side of the main shut-off valve seat 16. Preferably means is provided to variably restrict this second passage 66 to fix the maximum force caused by the dynamic effects of flow on the later described pilot valve member. For this purpose, an adjustment screw 69 may be threaded into the axial bore 67 to extend partially into the lower valve seat 52. The adjustment screw 69 is releasably secured by a lock nut 70.

The tubular extension 50 extends slidingly through the guide member 26 and is surrounded by a sealing element 72 which is secured in place by a washer 74 inside the guide member. What may be termed a valve spring 75 surrounds the upper boss 44 of the main valve member and seats against this upper washer 74 to continuously urge the main valve member toward its closed position.

A pilot valve member, generally designated 76, is mounted in the pilot valve chamber 48 and is connected with the control diaphragm 36 for movement therewith. The pilot valve member 76 has a lower ball-shaped valve head 78 that is movable between a lower position to close the pilot valve seat 52 and an upper position to close the intermediate pilot valve seat 54. The pilot valve member 76 also has an upper valve head 80 in the form of a conical enlargement that may be positioned to close the upper pilot valve seat 50a. In addition, the pilot valve member 76 has a thin tapered collar 82 between the first passage 60 and the upper valve seat 50a which substantially balances the pilot valve member with respect to the pressure admitted through the first passage 60. Thus, when the pilot valve member 76 is shifted upward slightly from the position shown in FIG. 1, fluid may flow upward through the tubular extension 50 around the thin tapered collar 82 at a restricted rate and the upward fluid pressure against the underside of the collar will substantially balance the downward fluid pressure against the upper side of the ball-shaped valve head 78.

The control diaphragm 36 may be of any suitable construction and may be connected to the pilot valve member 76 in any suitable manner. In the construction shown, the control diaphragm 36 has a large circular opening which is closed by an upper disk 84. The upper disk 84 is formed with a boss 85 to receive the lower end of a compression coil spring 86 which is confined between the upper disk and the top wall of the upper body section 14. The inner circular edge of the control diaphragm 36 is clamped between the upper disk 84 and a lower disk 88 by means of suitable screws 90 carrying nuts 92. The upper end of the pilot valve member 76 is formed with a flange 94 and is seated in an aperture 95 in the lower disk 88. For the purpose of assembly, the aperture 95 has an enlarged extension 96 that is dimensioned for the flange 94 to pass therethrough.

It is contemplated that some provision will be made for fluid to trickle into the upper control chamber 40 when the main valve member 18 is in its closed position. Any suitable bypass around the main valve member may be provided for this purpose. In the present construction, a bleeder port 98 is provided in the dividing wall 24 for this purpose. In the construction shown, a short piece of bent wire 100 is mounted in the bleeder port 98. The wire 100 is agitated by fluid flow and thereby functions as means to keep the bleeder port from becoming clogged.

It is apparent that the provision of the bleeder port 98 places the control chamber 40 in communication with the pressurized fluid source when the main valve member 18 is closed. As shown in FIG. 1, the pilot valve member 76 is in its lower position when the main valve member is in its closed position. With the pilot valve member 76 in its lower position, the first passage 60 is in communication with the second passage 66 for flow of the pressurized supply fluid through the main valve member into the power chamber 35 so that the supply fluid may trickle through the bleeder port 98 from the power chamber into the control chamber 40 and may pass from the control chamber 40 into the stand pipe 41.

*Operation*

The manner in which this first embodiment of the invention operates may be understood by reference to the series of simplified views, FIGS. 2 to 6 inclusive.

FIG. 2 represents the starting condition of the valve assembly when the fuel tank is empty and no pressure exists in the fuel supply line. At this time, the effect of the pressure exerted by the valve spring 75 is to hold the main valve member 18 in its closed position. The diaphragm spring 86 holds the pilot valve member 76 in its lowermost position relative to the main valve member with the ball portion 78 of the pilot valve member seated in the lower valve seat 52 and the conical head 80 of the pilot valve member seated in the upper pilot valve seat 50a. It is apparent that since the diaphragm spring 86 exerts downward pressure on the pilot valve member 76, the diaphragm spring as well as the valve spring 75 exerts closing force on the main valve member 18.

FIG. 3 indicates what happens when fuel initially flows into the fuel line to the inlet side of the valve. The initial pressure from the inflowing fuel forces the main valve member 18 off its seat against the opposition of the two springs 75 and 86. For a brief period, the main valve member 18 is in open position, as shown, while fuel flows through the first passage 60 in the main valve member 18 into the pilot valve chamber 48. Since both the lower valve seat 52 and the upper valve seat 50a are closed by the pilot valve member 76, the fuel flows from the pilot valve chamber 48 through the radial ports 55 and the radial bore 58 into the power chamber 35. Pressure quickly builds up in the power chamber 35 to the point where the downward pressure on the power diaphargm 34 overcomes the pressure of the fuel impinging on the main valve member 18. Consequently after only a brief open period, the main valve member 18 moves downward to the closed position shown in FIG. 4. The downward pressure exerted by the diaphragm spring 86 causes the pilot valve member 76 to follow these initial movements of the main valve member and to stay in its lowermost position relative to the main valve member.

In FIG. 4, fuel has filled up the power chamber 35 and is trickling out of the power chamber into the control chamber 40 through the bleeder port 98. The bleeder port 98 restricts the flow of fluid sufficiently to maintain adequate pressure in the power chamber 35 for keeping the main valve member 18 in its closed position.

The retarded flow through the bleeder port 98 fills the control chamber 40 and the fuel enters the lower end of the stand pipe 41 to cause a reference column of fuel to rise in the stand pipe. The rising column of fluid in the stand pipe creates an increasing hydrostatic pressure in the control chamber 40 with a consequent increasing force upward against the control diaphragm 36. When this increasing upward force equals the weight of the control diaphragm assembly plus the force of the diaphragm spring 86, the control diaphragm 36 begins to move upwardly to cause corresponding upward movement of the pilot valve member 76. Since the main valve member 18 is a slave to the pilot valve member 76, the main valve member correspondingly moves upward in its opening direction.

FIG. 5 shows by way of example the positions of the cooperating parts when the main valve member 18 reaches an intermediate position as a result of the rise of the reference column of liquid in the stand pipe 41. The pressure of the inflowing liquid against the inlet side of the main valve 18 tends to urge the main valve member upward relative to the pilot valve member 76. This upward force on the main valve member 18 is opposed by the downward pressure exerted by the valve spring 75 plus the fluid pressure in the power chamber 35 acting against the power diaphragm 34. Consequently the main valve member 18 seeks an equilibrium position at which the downward force created in the power chamber 35 against the power diaphragm 34 is precisely sufficient with the help of the valve spring 75 to balance the upward pressure of the fuel against the inlet face of the main valve member. Thus in FIG. 5, the ball portion 78 of the pilot valve member 76 is slightly unseated from the lower valve seat 52 to permit release of fluid from the power chamber 34 through the previously mentioned second passage 66 at just the rate to maintain the equilibrium. If the main valve member 18 were to shift in its opening direction from this balanced position, it would further restrict the release of fluid from the power chamber and would correspondingly increase the downward force created in the power chamber. On the other hand, any tendency of the valve spring 75 to move the main valve member 18 in its closing direction from the equilibrium position shown in FIG. 5 would result in greater release flow through the second passage 66 to reduce the force in the power chamber 35 that opposes the valve-opening force exerted by the fuel against the main valve member 18.

With the pilot valve member 76 slightly elevated relative to the main valve member 18 in the manner shown in FIG. 5, a portion of the fluid that enters the pilot valve chamber 48 from the first passage 60 is free to flow through the upper valve seat 50a into the control chamber 40 and the stand pipe 41 after passing restriction 76a. As the tank fills, the reference column of liquid rises progressively, always tending to exceed the rising static head by a differential equivalent to the pressure drop across the valve which equals the pressure on the intake side of the main valve member 18. When the reference column establishes this differential, the consequent pressure in the control chamber causes the control diaphragm to lift the valve member 76 to its maximum elevation and thereby causes the main valve member 18 to move upward to its maximum open position. This movement of the main valve member 18 from its closed position shown in FIG. 4 to its maximum open position shown in FIG. 6 occurs in a rapid manner once the tapered head 80 of the pilot valve member 76 is unseated from the upper valve seat 50a. The differential pressure in the control chamber 40 is limited by either the pressure drop across the valve or by the static head available at the bottom of the stand pipe 41.

The presence of the thin tapered collar 82 on the stem of the pilot valve member 76 results in the pilot valve member being substantially balanced with respect to the pressure created in the pilot valve chamber by the supply fluid entering through the first passage 60. Thus, the effective area of the thin tapered collar 82 is substantially equal to the effective area of the ball portion 78 of the pilot valve member with respect to the fluid pressure in the pilot valve chamber between the thin tapered collar and the ball portion. This balancing of the pilot valve member is especially desirable for stable operation during the transition stage in which the rising pilot valve member 76 causes the main valve member 18 to rise from the closed position shown in FIG. 4 to the fully open position shown in FIG. 6 and conversely during the closing cycle. In addition it prevents a high flow rate through the pilot chamber during the closing and opening cycles. This is important because high flow rates through the stand pipe would introduce errors in the sensitivity of level control.

Figure 6:
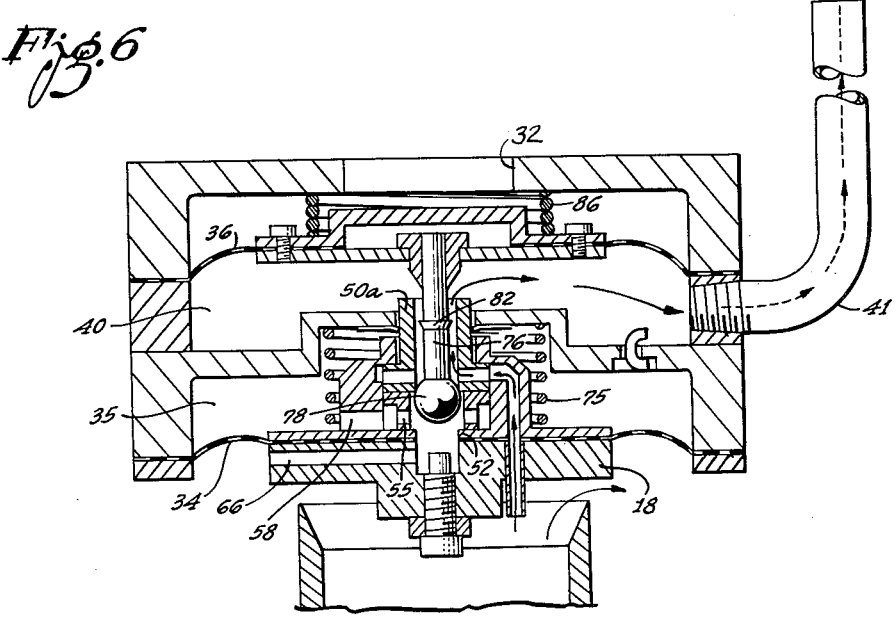

With the main valve member 18 at its maximum open position shown in FIG. 6 and with fuel entering the tank at maximum rate, the static pressure that is exerted on the upper surface of the control diaphragm 36 rises correspondingly but the reference column keeps ahead by the aforementioned differential until the liquid finally reaches the top of the stand pipe and over-flows.

The desired maximum liquid level at which the main valve member 18 is to cut off flow from the supply source is indicated at 102 in FIG. 1. It is to be noted that the upper end of the stand pipe 41 extends above the liquid level 102 by a distance A. This distance is determined by the downward force exerted against the control diaphragm 36 by the diaphragm spring 86 and further depends on the area of the control diaphragm 36. A broken line 104 in FIG. 1 indicates a level below the maximum level 102 and this lower level 104 may be aptly termed the approach level. The vertical distance B between the ultimate maximum level 102 and the approach level 104 is determined by the force exerted by the diaphragm spring 86 when the control diaphragm is at its upper limit position with the diaphragm spring under maximum compression. With the stand pipe overflowing, the static head gains on the reference head and it is at the approach level 104 that the progressive rise of the static head exerted downward on the control diaphragm 36 reaches a point where its magnitude plus the magnitude of the force of the completely compressed diaphragm spring 60 exactly balances the reference head exerted on the underside of the control diaphragm.

Further rise of the liquid level above the approach level 104 progressively lessens the upward differential fluid pressure across the diaphragm and correspondingly permits the diaphragm spring 86 to expand progressively and push the control diaphragm 36 downward in accord with the progressive diminishing of the pressure differential. Thus the fuel flows into the tank at the maximum rate until the approach level 104 is reached and then, in the rise of the liquid level over the final distance B, the pilot valve member 76 is gradually shifted downward.

Since the main control valve member 18 is a slave to the pilot valve member 76 in that it continually seeks an equilibrium position relative to the pilot valve member, as heretofore explained, the main valve member follows closely this final gradual downward movement of the pilot valve member to shut off flow gradually without creating any substantial pressure surge. The main valve member is held in its closed position with the pilot valve member 76 in its lowermost position, as shown in FIG. 4, as long as fuel pressure continues to exist against the inlet side of the main valve member. The necessary predominant force to keep the main valve member closed is created in the power chamber 34 since the ball portion 78 of the pilot valve member 76 is fully seated against the lower valve seat 52 to cut off release of the fluid from the control chamber 48 through the second passage 66. When the fuel pressure against the inlet side of the main valve member 18 ceases, the spring 75 keeps the main valve member closed.

*The Second Embodiment of the Invention Shown in FIG. 7*

To a large extent, the structure shown in FIG. 7 is identical with the structure of the first embodiment of the invention, as indicated by the use of corresponding numerals to designate corresponding parts. The structure differs only as required by the substitution of a control means in the form of a float 110 for the first described control means in the form of the control diaphragm 36. The valve assembly must, of course, be at an elevated position in the tank.

In the particular construction shown, the valve body comprises the previously described lower cage section 10 together with an upper body section 112 and the margin of the power diaphragm 34 is sandwiched between these two body sections. The upper body section 112 has a central circular aperture 114, the rim of which is formed with a circumferential recess 115 to engage the lower radial flange 116 of a guide member, generally designated 118.

The guide member 118 has a radial wall 120 to seat the upper end of the usual valve spring 75 and has an upwardly extending tubular portion 122 in which a pilot valve member 76a is suitably mounted. The pilot valve member 76a is largely identical with the previously described pilot valve member 76 but in this instance has an upper valve head 80a which is part of an enlarged extension 124 that is slidingly mounted in the tubular portion 122 of the guide member 118. The tubular portion 122 has radial ports 125 to permit fluid communication between the power chamber 35 and the interior of the fuel tank when the upper valve head 80a is raised from the upper valve seat 50a. The extension 124 of the pilot valve member 76a is circumferentially grooved at its upper end to form a neck 126 to receive the forked end 128 of an arm 130 on which the float 110 is mounted. The arm 130 is mounted by a pivot 132 on a bracket member 134 that is integral with the upper body section 112.

The main shut-off valve member 18 in FIG. 7 is of the same construction as in the first embodiment of the invention and the upward tubular extension 50 is slidable in the same manner in the tubular guide portion 122 of the guide member 118.

FIG. 7 shows the condition of the valve when the fuel tank is empty and no pressure exists on the inlet side of the valve. At this time, the weight of the float exerts a lifting force on the pilot valve member 76a to hold the pilot valve member in its uppermost position relative to the main shut-off valve member 18. The shut-off valve member 18, however, is held in its closed position by the pressure of the valve spring 75.

When fuel under pressure is supplied to the inlet side of the main shut-off valve member 18, the pressure of the fuel lifts the main valve member to open position against the resistance of the spring 75. The main valve member 18 stays in open position because the weight of the float 110 continues to exert lifting force on the pilot valve member 76a and causes the pilot valve member to travel upward with the main valve member and to maintain its uppermost position relative to the main valve member. Since the pilot valve member 76a maintains its uppermost position relative to the main valve member 18, the ball portion 78 of the pilot valve member remains in its full open position with respect to the lower valve seat 52 to permit free release of fluid from the power chamber 35. This free release keeps the pressure in the power chamber from rising high enough to exert effective closing force on the main valve member.

Eventually the body of liquid fuel in the tank reaches an approach level 135 which is the level at which the float 110 starts to be carried upward by the rising liquid. As the fuel level rises above this point, the float 110 gradually forces the pilot valve member 76a downward to shift the ball portion 78 of the pilot valve member toward the lower valve seat 52 for consequent rise in pressure in the power chamber 35. Since the main valve member 18 seeks an equilibrium position relative to the pilot valve member 76a, as heretofore described, the main valve member follows the gradual downward movement of the pilot valve member and reaches a completely closed position when the fuel level reaches the desired ultimate maximum level indicated at 136.

My description in specific detail of the selected embodiments of the invention will suggest various changes, substitutions and other departures from my disclosure within the spirit and scope of the appended claims.

I claim:

1. Means to control flow of a liquid from a pressurized supply into a receptacle through an inlet port in the receptacle, comprising: a main valve member to open and close said inlet port and movable to closed position in opposition to the pressure from said source whereby the pressure from the source applies opening force to the main valve member; means including a power chamber with a movable wall operatively connected with said main valve member to receive pressure from said source and to apply a consequent closing force to said main valve member; a first passage through the main valve member from its inlet side to said power chamber for transmitting pressure from the source to the power chamber; a second passage through said main valve member from said power chamber to release fluid therefrom and thereby control the pressure therein; wall means movable through a range of positions corresponding to the range of positions of said main valve member, one side of said wall means being exposed to the static head of the accumulated liquid in the discharge side of the main valve to urge the wall means toward a given position corresponding to the closed position of said main valve member; means to confine a column of the liquid to establish a reference head against the other side of the wall means comparable to a selected static head of the liquid on the downstream side of the main valve whereby the wall means is responsive to both of said heads to move to a limit position when the static head reaches a predetermined magnitude relative to the reference head; means to divert a portion of the liquid from said source to said confining means to form a liquid column therein; and a pilot valve member at said main valve member movable relative thereto and operatively connected with said wall means for movement therewith toward the closed position of the main valve member as the wall means moves toward said given position, said pilot valve member progressively restricting said second passage to progressively raise the pressure in said power chamber in response to movement of the main valve member in its opening direction relative to the pilot valve member whereby the main valve member seeks a position relative to said pilot valve member at which the forces acting on the main valve member are in equilibrium and consequently the main valve member closely follows the movements of the pilot valve member.

2. A combination as set forth in claim 1 in which said movable wall of the power chamber is exposed to the static head when the main valve member is in an open position and in which said movable wall is of substantially the same area as the wall means.

3. A combination as set forth in claim 2 which includes spring means continuously exerting closing force on said main valve member.

4. Means to control flow of a liquid from a pressurized supply into a receptacle through an inlet port in the receptacle, comprising: a main valve member to open and close said inlet port and movable to closed position in opposition to the pressure from said source whereby the pressure from the source applies opening force to the main valve member; means including a power chamber with a movable wall operatively connected with said main valve member to receive pressure from said source and to apply a consequent closing force to said main valve member; wall means movable through a range of positions corresponding to the range of positions of said main valve member, one side of said wall means being exposed to the static head of the accumulated liquid on the discharge side of the main valve; means to confine a column of the liquid to establish a reference head against the other side of the wall means comparable to a selected static head of the accumulated liquid on the discharge side of the main valve whereby the wall means is responsive to both of said heads to move to a given position when the static head reaches a predetermined magnitude relative to said reference head; a bleed passage from said source to said confining means to divert liquid thereto to form a reference column therein; a first passage through the main valve member from its inlet side to said power chamber for transmitting pressure from the source to the power chamber; a second passage through said main valve member from said power chamber to release fluid therefrom and thereby control the pressure therein; a third passage through said main valve member from said source to said confining means to divert additional liquid thereto to expedite the formation of a reference column; and a pilot valve member at said main valve member movable relative thereto and operatively connected with said wall means for movement therewith toward the closed position of the main valve member as the wall means moves toward said given position, said pilot valve member progressively restricting said second passage to progressively raise the pressure in said power chamber in response to movement of the main valve member in its opening direction relative to the pilot valve member whereby the main valve member seeks a position relative to said member of the control means at which the forces acting on the main valve member are in equilibrium and consequently the main valve member closely follows the movements of the pilot valve member, said pilot valve member closing said third passage at the position of the pilot valve member relative to the main valve member at which said second passage is sufficiently restricted to cause the main valve member to close.

5. Means to control flow of a liquid from a pressurized supply into a receptacle through an inlet port in the receptacle, comprising: a main valve member to open and close said inlet port and movable to closed position in opposition to the pressure from said source whereby the pressure from the source applies opening force to the main valve member; means including a power chamber with a movable wall operatively connected with said main valve member to receive pressure from said source and to apply a consequent closing force to said main valve member, said power chamber having a release port; a passage for restricted flow of liquid from said pressurized supply to said power chamber for creating fluid pressure therein; a control chamber having a movable wall, the side of said movable wall on the inside of said control chamber being exposed to the static head of the liquid in the receptacle; a stand pipe to receive liquid diverted by said first passage and to form a column of the liquid to apply a reference pressure to the side of said movable wall on the inside of the control chamber comparable to the static head at a selected liquid level in the receptacle whereby the movable wall of the control chamber is responsive to both said static head and said reference pressure; and valve means operated by said movable wall of the control chamber to close said release port to cause the main valve member to close when the static head reaches a predetermined magnitude relative to said reference pressure.

6. A combination as set forth in claim 5 which includes means to bias said movable wall of the control chamber to supplement the force exerted by the static head on the movable wall of the control chamber.

References Cited in the file of this patent
UNITED STATES PATENTS

| | | |
|---|---|---|
| 1,955,495 | Hack | Apr. 17, 1934 |
| 2,548,354 | Davies | Apr. 10, 1951 |
| 2,620,818 | Symmons | Dec. 9, 1952 |
| 2,699,316 | Mosher | Jan. 11, 1955 |
| 2,736,337 | Parks et al. | Feb. 28, 1956 |
| 2,843,145 | Koehler | July 15, 1958 |
| 2,911,000 | Doyle | Nov. 3, 1959 |